United States Patent [19]

Gerst et al.

[11] 4,209,791
[45] Jun. 24, 1980

[54] ANTENNA APPARATUS FOR BEARING ANGLE DETERMINATION

[75] Inventors: Carl W. Gerst, Skaneateles; Hugh A. Hair, Fayetteville; Stig L. Rehnmark, Skaneateles, all of N.Y.

[73] Assignee: Anaren Microwave, Incorporated, Syracuse, N.Y.

[21] Appl. No.: 948,977

[22] Filed: Oct. 5, 1978

[51] Int. Cl.² .............................................. H01P 1/18
[52] U.S. Cl. .................................. 343/854; 343/754; 343/909
[58] Field of Search ............... 343/854, 754, 756, 909, 343/911 R, 769

[56] References Cited

U.S. PATENT DOCUMENTS 3,500,412   3/1970   Trigon .................................. 343/854
4,127,857  11/1978   Capps et al. ......................... 343/854

Primary Examiner—David K. Moore
Attorney, Agent, or Firm—Hane, Roberts, Spiecens & Cohen

[57] ABSTRACT

Antenna apparatus for representing a bearing angle includes an antenna array of N antenna elements equispaced around the arc of a circle of at least 90°, and preferably greater than 180° in a plane for receiving microwave energy, microwave power dividing and phase transforming matrix having N input ports respectively connected to the antenna elements and a set of output ports connected to a utilization device for indicating the bearing angle of the incoming microwave energy, and a utilization device including means for measuring the phase difference between signals at pairs of the output ports for representing the bearing angle.

8 Claims, 3 Drawing Figures

BEARING INDICATOR SYSTEM

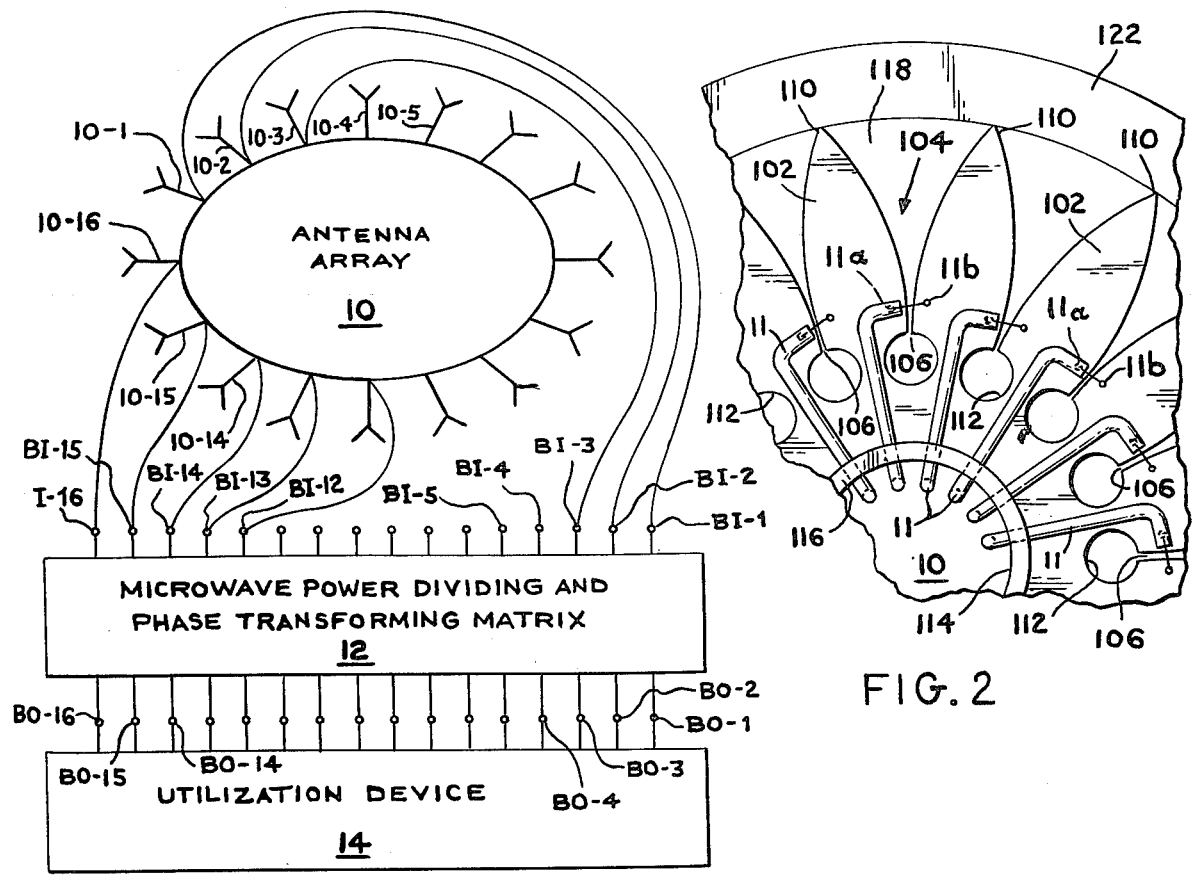
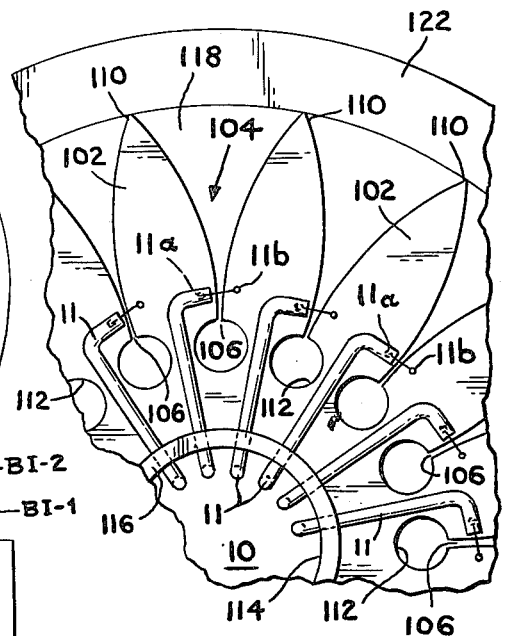
BEARING INDICATOR SYSTEM
FIG. 1
FIG. 2
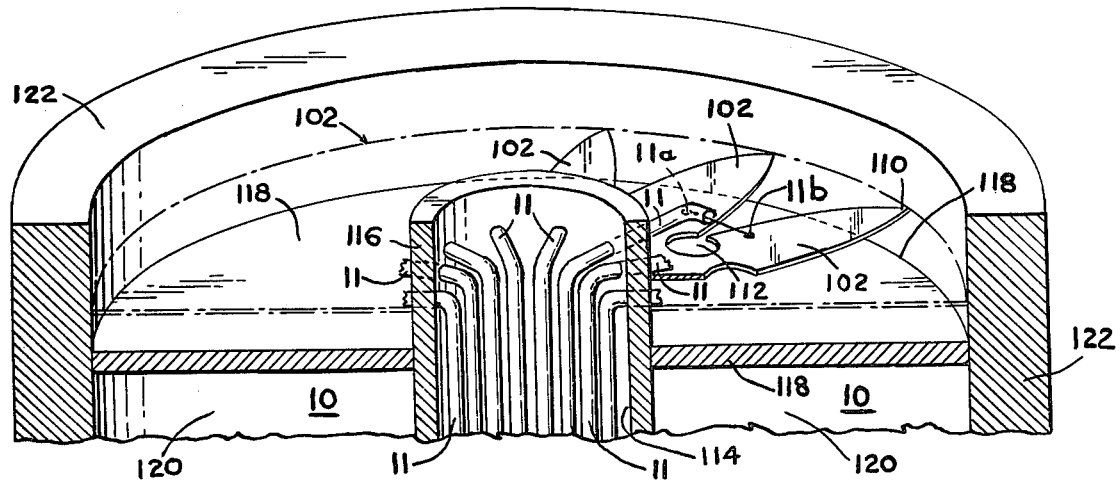
FIG. 3

ANTENNA APPARATUS FOR BEARING ANGLE DETERMINATION

BACKGROUND OF THE INVENTION

This invention pertains to antenna systems for azimuth-or-bearing indicators.

There are many instances where it is necessary to know at a site the bearing angle of a remote source of microwave power. For instance, ships quite often need to know the position of other ships in fog or at night, particularly, when the other ships are hunting targets by means of search radar. Similar situations arise between airplanes and radar guided missiles. Existing systems performing a similar function consist of a circular array of elements (usually cavity-backed spirals) with carefully matched radiation patterns, amplitude tracking log-video detectors, and the angle of arrival is interpolated by comparing the relative amplitudes of the receive channels. The bearing resolution of this type of discriminator is poor, especially considering frequency response which depends on precise amplitude tracking of the elements and the log-video receivers versus frequency.

Other such bearing angle indicators required rotating antennas wherein the instantaneous angular position of the antenna was used in determining the bearing of a microwave power source. If should be apparent that rotating antennas are not only unreliable but because of their mechanical configuration add complexity, weight and bulk to the system. In addition the rotating antenna is also quite slow, typically of the order of 1 revolution per second, and covers only a very small angle at any instant of time.

There have been proposals for instantaneous bearing monitors using fixed (non-rotating) antennas comprising four radiators connected via a 4-input, 4-output Butler matrix to a two-input phase discriminator whose output feeds a cathode ray tube display. Such systems can only give coarse bearing indications because of inherent errors in the system. In NRL Report 8005 entitled "Ambiguity-Resistant Three- and Four-Channel Interferometers" by Robert Goodwin there are proposals for devices using more than four radiators. However, such devices are concerned with linear arrays which cannot scan more than 180° of azimuth range.

SUMMARY OF THE INVENTION

It is a general object of the invention to provide an improved antenna system for an azimuth angle or bearing indicator utilizing a non-rotating antenna which provides omniazimuthal coverage with the same advantages and accuracy as interferometric linear arrays without being sensitive to operating frequencies.

Briefly, the invention contemplates antenna apparatus with N antenna elements equispaced about an arc of a circle for receiving the microwave energy from a remote source. The N input ports of a microwave power dividing and phase transforming means are connected to the antenna elements respectively. The output ports of the microwave power dividing and phase transforming means are adapted to be connected to processing means to yield a representation of the bearing angle. It should be noted that such a configuration gives sets of output ports where the relative phase is an integral multiple of the azimuth or bearing angle and is not sensitive to frequency.

DESCRIPTION OF THE DRAWING

Other objects, the features, and advantages of the invention will be apparent from the following detailed description when read with the accompanying drawing which shows by way of example and not limitation the presently preferred embodiment of the invention. In the drawing:

FIG. 1 is a block diagram of a bearing indicator system utilizing the invention;

FIG. 2 is a plan view of an antenna array having slot elements used in the system of FIG. 1; and FIG. 3 is a cross-sectional view taken along the line 3—3 of FIG. 2.

DESCRIPTION OF THE PREFERRED EMBODIMENT

In FIG. 1 the direction finding system for reliably indicating the bearing angle of a source of microwave energy has a 360° azimuthal coverage and includes: the N-element antenna array 10 for receiving microwave energy; the microwave power dividing and phase transforming matrix 12; and the utilization device 14.

The antenna array 10 comprises sixteen identical antenna elements 10-1 to 10-16 arrayed along the periphery of a circle in the horizontal plane and constructed to predominantly radiate energy radially with a moderate component in directions normal to the plane of the circle. In particular, the antenna elements are equispaced about the circle 10R with the element 10-16 considered to be at the 0° azimuth angle. Note the use of 16 elements is preferred. The number should however be at least four.

While there could be used conventional dipole elements, or cavity backed spirals, or multifilar helices, or slots extending peripherally around a cylindrical conductor, it is preferred to use the antenna array of FIGS. 2 and 3.

The antenna array 10 as shown in FIGS. 2 and 3 is built from a circular disk 102 of conductive material having a plurality of slot elements radially extending from feed points about an intermediate circle. A typical slot element 104 extends from feed point 106. At the feed point 106 one wall of the slot is connected to the outer conductor 11a of a coaxial line 11 and the other wall is connected to the central conductor 11b of the line 11. While coaxial conductors are used, the invention also contemplates the use of slot conductors, strip line or microstrip line. The width of the typical slot 104 monotonically increases from a minimum width at the feed point to a maximum width at the periphery of the disk. The tapering increase in width is preferably chosen so that the walls of adjacent slots meet at peripheral points such as point 110. Behind each feed point there is a very high impedance means 112 preferably in the form of a circular opening having a diameter colinear with the axis of the slot and having a circumference approximately larger than one half of an operating wavelength.

The disk is provided with a central opening 114. Abutting the periphery of the disk 102 is a hollow cylinder 116. This cylinder is preferably a conductor in order to provide a ground plane. However, in some instances it may be desirable to make the cylinder of a microwave energy absorber. It is also preferably to place a disk 118 of such absorber between the disk 102 and the component housing 120. In order to insure that any linearly polarized wave will be received it is preferred to position about the peripheral edge of disk 102 the circular to linear polarizer 122.

Each of the antenna elements 10-1 to 10-N is connected via its own coaxial cable 11-1 to 11-16 to the respective input port BI-1 to BI-16 of the power dividing and phase transforming matrix 12. It should be noted that the cable length between an antenna element and input port must be the same for every port, otherwise any differences would introduce relative phase shifts among the signals and distort the results.

The microwave power dividing and phase transforming matrix 12 has the following properties.

All ports are isolated from each other. If there are N input ports and N output ports, then a signal fed into any one of the output ports will be divided equally between the N input ports and there will be a uniform phase slope across the N input ports which is proportional to the position number of the input ports.

It can be shown that the input to the ith output port of the matrix will excite the ith mode at the input ports which is given by the following equation:

$$E_i = \frac{1}{\sqrt{N}} \begin{vmatrix} e^{ki} \\ e^{2ki} \\ e^{3ki} \\ \cdots \\ \cdots \\ e^{(N-1)ki} \\ e^{Nki} \end{vmatrix};$$

where
i = the input port number;
N = the total number of input ports,
K = j ($2\pi/N$); and
j = $\sqrt{-1}$ Thus, it can be shown for a 16-input port, 16-output port matrix the phases associated with the input ports for the first two modes would be according to the following table:

Table I

| Input Port | First Mode | Second Mode |
| --- | --- | --- |
| 1 | 22.5° | 45° |
| 2 | 45° | 90° |
| 3 | 67.5° | 135° |
| 4 | 90° | 180° |
| . | . | . |
| a | a · (22.5)° | a · (45)° |
| a + 1 | (a + 1) · (22.5)° | (a + 1) · (45)° |
| . | . | . |
| 15 | 337.5° | 315° |
| 16 | 360° | 360° |

The first thing to note in that input port 16 has the same phase shift for both modes. In fact, it would have the same phase shift for every mode. Thus, the position of the antenna element connected to this port is preferably the reference position from which azimuth angles are measured. However, it is possible to introduce a constant phase shift at one of the outputs without degrading the overall performance. For example, if a 180° phase shift were added at output port 1, the system would still work. But the new reference would be the antenna element connected to the input port number 8. Due to reciprocity of the power dividing and phase transforming matrix a signal at one input port will get a "phase tag" which is measured at the output ports. Thus it is possible to tell from which input port a signal is coming by observing the phase at the output ports.

An incoming signal will be received by more than one antenna element and it can be shown that to a good first approximation, that a signal coming in at an angle $\theta$ will emit a signal at the output port b according to the following equation $$R_b = Ae^{jb\theta}$$

where A = a constant, and j = $\sqrt{-1}$. The important thing to note is that between adjacent output ports the phase difference equals the azimuth angle. In general, the phase difference between the signals at any two output ports (b) and (b−c) is c$\theta$. For a further discussion including how to construct such matrices see my U.S. Pat. Nos. 3,731,217 and 3,517,309.

In some instances, it may not be possible to mount an antenna with a 360° field of view. In such a case some of the antenna elements can be disconnected from the power dividing and phase transforming matrix. The corresponding input ports to the matrix are terminated. One such instance is an antenna mounted in the tip of a wing of an aircraft. If the tip of the wing is defined as the zero degree bearing angle, elements equispaced from +135° to −135° will provide coverage from approximately +90° to −90°. A system of this type mounted in each of two wing tips would provide 360° coverage.

On the other hand, a mounting location near the top of a mast of a ship could accommodate a full circle with 360° coverage.

It should be noted that many of the output ports are terminated within the matrix and never are visible output ports.

The output ports BO-N of the matrix 12 are connected to the utilization device 14 where the analog phase difference signals are processed to indicate bearing angle. Included in the utilization device 14 are elements which measure the phase differences in signals from pairs of the output ports BO-N. These phase differences are indications of the bearing angle.

What is claimed is:

1. Antenna apparatus for generating a representation of a bearing angle comprising: antenna array means having N antenna elements equispaced about an arc of a circle greater than 180° in a plane for receiving microwave energy, where N is greater than 4, said antenna array means comprising a disk of conductive material, said disk having a plurality of slots, each of said slots extending radially outward from a different point displaced from the center of the disk to the periphery thereof, the width of each slot monotonically increasing from the point to the periphery of the disk and means at each of the points for accepting microwave energy arriving in the slot from the periphery of the disk; microwave power dividing and phase transforming means having N input ports respectively connected to said antenna elements and having a set of output ports; and a utilization device having input ports connected to the output ports of said microwave power dividing and phase transforming means, said utilization device including means for measuring the phase difference between signals from at least one pair of the output ports of said microwave power dividing and phase transforming means, the phase difference representing the bearing angle.

2. The apparatus of claim 1 further comprising microwave energy absorbing means positioned between each point and the center of the disk.

3. The apparatus of claim 1 or 2 further comprising microwave energy absorbing means positioned in a plane on one side of the disk.

4. The apparatus of claim 3 further comprising a polarizing means disposed in front of each of said slots.

5. A multielement antenna comprising a circular disk of conductive material, a plurality of feed points equispaced about an intermediate circle on the disk which is concentric with the center of the disk, a microwave energy conductor connected to each of said feed points, a plurality of slots, each of said slots radially extending from a different feed point to the periphery of the disk, the width of each slot monotonically increasing in width from the feed point to the periphery of the disk, and high impedance means at each of the feed points for directing microwave energy along the slots.

6. The antenna of claim 5 wherein each of said impedance means comprises a circular opening having a diameter colinear with the axis of the associated slot and a circumference approximately larger than one half of an operating wavelength.

7. The antenna of claim 6 wherein said disk is provided with a central circular opening, and further comprising a hollow cylindrical conductor extending through the central circular opening to provide an omnidirectional ground plane.

8. The antenna of claim 5 further comprising a further hollow cylindrical polarized disposed about and concentric with said disk.

* * * * *